(12) United States Patent
Nagashima et al.

(10) Patent No.: US 10,310,159 B2
(45) Date of Patent: Jun. 4, 2019

(54) OPTICAL WAVEGUIDE DEVICE

(71) Applicants: NTT Electronics Corporation, Kanagawa (JP); Nippon Telegraph and Telephone Corporation, Tokoyo (JP)

(72) Inventors: Shigeo Nagashima, Yokohama (JP); Yoshiteru Jinnouchi, Yokohama (JP); Takashi Nakayama, Yokohama (JP); Hiroki Kawashiri, Yokohama (JP); Ikuo Ogawa, Yokohama (JP); Yusuke Nasu, Yokohama (JP); Shunichi Soma, Atsugi (JP)

(73) Assignees: NTT Electronics Corporation, Kanagawa (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 15/737,386

(22) PCT Filed: Jun. 1, 2016

(86) PCT No.: PCT/JP2016/002661
§ 371 (c)(1),
(2) Date: Dec. 18, 2017

(87) PCT Pub. No.: WO2016/208126
PCT Pub. Date: Dec. 29, 2016

(65) Prior Publication Data
US 2018/0136392 A1    May 17, 2018

(30) Foreign Application Priority Data
Jun. 25, 2015 (JP) .................................. 2015-127900

(51) Int. Cl.
*F21V 8/00* (2006.01)
*G02B 5/136* (2006.01)
(Continued)

(52) U.S. Cl.
CPC ........... *G02B 6/0026* (2013.01); *G02B 6/136* (2013.01); *G02B 6/29368* (2013.01); *G02B 6/12* (2013.01);
(Continued)

(58) Field of Classification Search
CPC . G02B 6/12; G02B 6/13; G02B 6/136; G02B 6/0026; G02B 6/12109; G02B 6/29361; G02B 6/29368
(Continued)

(56) References Cited

U.S. PATENT DOCUMENTS 4,621,895 A * 11/1986 Motsko .................... G02B 6/25
  385/47
4,900,118 A *  2/1990 Yanagawa ............ G02B 6/2817
  156/158
(Continued)

FOREIGN PATENT DOCUMENTS

JP    H0713019 A    1/1995
JP    2614365 B2    2/1997
(Continued)

OTHER PUBLICATIONS

"Etching submicrometer trenches by using the Bosch process and its application to the fabrication of antireflection structures" by Chang et al, J. Micromech. Microeng., vol. 15, pp. 580-585, 2005.*
(Continued)

*Primary Examiner* — Robert Tavlykaev
(74) *Attorney, Agent, or Firm* — Workman Nydegger

(57) ABSTRACT

In the case of implementing a polarization separation circuit, a polarization rotator, and the like by inserting a thin-film element into a substrate in one optical interference circuit, one common large-sized groove shared among a plurality of thin-film elements for their insertion has been formed. The optical waveguide type device of the present invention is
(Continued)

configured such that at least one groove intersects only one corresponding optical waveguide for inserting the thin-film element and does not intersect other optical waveguides adjacent to the one corresponding optical waveguide. This groove substantially has a rectangular shape, and has a minimum size adapted to the thin-film element to be inserted so as to stably hold and fix the thin-film element in the groove. Adjacent grooves are formed so as to be arranged such that their portions in a direction substantially vertical to the optical waveguide are facing each other.

17 Claims, 10 Drawing Sheets

(51) Int. Cl.
G02B 6/293 (2006.01)
G02B 6/136 (2006.01)
G02B 6/12 (2006.01)
G02B 6/13 (2006.01)
G02B 6/125 (2006.01)
G02B 6/126 (2006.01)

(52) U.S. Cl.
CPC .......... G02B 6/12004 (2013.01); G02B 6/125 (2013.01); G02B 6/126 (2013.01); G02B 6/13 (2013.01); G02B 2006/12116 (2013.01)

(58) Field of Classification Search
USPC ...................... 385/14, 15, 129–132
See application file for complete search history.

(56) References Cited

U.S. PATENT DOCUMENTS

| | | | | |
|---|---|---|---|---|
| 5,949,928 A * | 9/1999 | Kadoi | ................ | G02B 6/12007 385/14 |
| 6,061,487 A * | 5/2000 | Toyama | ................ | G02B 6/125 359/618 |
| 6,085,000 A * | 7/2000 | Tanaka | ................ | G02B 6/12007 385/45 |
| 6,356,679 B1 * | 3/2002 | Kapany | ................ | G02B 6/29368 385/17 |
| 6,553,171 B1 | 4/2003 | Takahashi et al. | | |
| 7,072,541 B2 * | 7/2006 | Kim | ................ | G02B 6/12007 385/132 |
| 2003/0002778 A1 * | 1/2003 | Bach | ................ | G02B 6/3538 385/16 |
| 2004/0223682 A1 * | 11/2004 | Ding | ................ | G02B 6/12004 385/14 |
| 2006/0023989 A1 * | 2/2006 | Yanagisawa | ........ | G02B 6/12007 385/14 |
| 2006/0083473 A1 * | 4/2006 | Ticknor | .............. | B01F 13/0076 385/129 |
| 2006/0126994 A1 * | 6/2006 | Higuchi | ................ | G02B 6/42 385/14 |
| 2007/0160322 A1 * | 7/2007 | Ide | ................ | G02B 6/4214 385/24 |
| 2008/0226230 A1 | 9/2008 | Kuroda et al. | | |
| 2013/0301977 A1 * | 11/2013 | Saida | ................ | G02B 6/126 385/11 |

FOREIGN PATENT DOCUMENTS

| | | |
|---|---|---|
| JP | 2003-512645 A | 4/2003 |
| JP | 2003-294964 A | 10/2003 |
| JP | 2004-309530 A | 11/2004 |
| JP | 2008-40094 A | 2/2008 |
| JP | 2013-12548 A | 1/2013 |
| JP | 2014-134593 A | 7/2014 |
| WO | 2007/058312 A1 | 5/2007 |

OTHER PUBLICATIONS

International Search Report dated Aug. 23, 2016, issued in PCT Application No. PCT/JP2016/002661, filed Jun. 1, 2016.
International Preliminary Report on Patentability dated Jan. 4, 2018, issued in PCT Application No. PCT/JP2016/002661, filed Jun. 1, 2016.
Satoshi Tsunashima et al., *Silica-based, Compact and Variable-Optical-Attenuator Integrated Coherent Receiver with Stable Optoelectronic Coupling System*, Optics Express, vol. 20, No. 24, Nov. 19, 2012, pp. 27174-27179.

* cited by examiner

OPTICAL WAVEGUIDE DEVICE

TECHNICAL FIELD

The present invention relates to an optical circuit having a thin-film element inserted into a substrate of an optical waveguide type device and an optical device which is implemented by using the optical circuit.

BACKGROUND ART

As a background of explosive diffusion of smartphones, portable tablet terminals, and the like and the start of video distribution services, demand for increase in optical network transmission capacity continues to grow day by day. Further development of optical communication technology is required by responding to this demand, and techniques for realizing downsizing and cost reduction for components used in optical communication systems are increasingly important. As one of the techniques that has been playing an important role to implement the components for optical communication systems, there is a waveguide type device. In the waveguide type device, various fundamental functions such as an optical signal branching/coupling device, a wavelength multiplexer/demultiplexer, an interleaving filter, an optical switch, and a Variable Optical Attenuator (VOA) are implemented by applying the interference principle of a light. As these devices have the structure of a waveguide type, they have features such that their circuit designs are flexible and easy for the size increase and high integration. Further, waveguide type devices are manufactured by using a process of manufacturing semiconductor components such as an LSI, and thus, they are also highly expected as devices having excellent mass productivity. As a material for a waveguide part, various materials such as semiconductors and polymeric materials are put into use. Particularly, a silica-based optical waveguide fabricated on a silicon substrate has features of excellent stability achieving low loss and excellent matching with optical fibers, and further, it is one of the most practical waveguide type devices.

In order to respond to the demand for increasing the above-described optical network transmission capacity, digital coherent optical transmission technology has been widespread. Among optical communication components configured by using the waveguide type device, an optical transceiver used for digital coherent optical transmission is particularly focused on. This optical transceiver implements, in a Wavelength Division Multiplexing (WDM) optical signal, high-speed operation with the transmission rate of 100 Gb/s per wavelength.

An optical signal modulation scheme mainly used in the digital coherent optical transmission technology is a phase modulation. Specifically, Phase Shift Keying (PSK) or Quadrature Amplitude Modulation (QAM) scheme, which is a phase modulation scheme which combines with intensity modulation, is used. Furthermore, in the digital coherent optical transmission technology, in addition to the phase modulation, a polarization multiplexing scheme that multiplexes a plurality of phase-modulated optical signals by two orthogonal light polarizations is combined to implement the above-described high-speed transmission rate.

An optical receiver in a digital coherent optical transmission system includes an optical interference circuit which performs, at its front end, signal processing for an optical signal. Interfering light obtained from the optical interference circuit is detected by Photo Detector (PD) to convert it into an electric signal, and a received signal is obtained. The received signal from the optical interference circuit implements, via subsequent digital signal processing, modulation of a polarization-multiplexed phase modulation signal.

In the above-described optical interference circuit, the optical waveguide type device is widely used, and includes fundamental elements such as a VOA which adjusts the light intensity of a signal light, Polarization Beam Splitter (PBS) which splits polarized waves of a signal light, a polarization rotator (polarization rotating device) which rotates a polarized wave of a signal light or a local light, and a 90-degree hybrid which detects waves of a retardation by interference between the signal light and the local light. Particularly, an optical waveguide type device using the silica-based optical waveguide is also generally called a Planar Lightwave Circuit (PLC). In realizing further diffusion of digital coherent optical transmission systems and the increase in their capacities in future, the optical receiver including the PLC will be a key component.

FIG. 1 is a diagram showing a configuration of an optical interference circuit configured by the PLC in an optical receiver of a conventional technique, and is a top view viewing a substrate face of a silicon substrate on which an optical interference circuit is configured. Here, an explanation on detailed operation will be omitted, but the diagram depicts substantial shapes of the practical fundamental elements in the optical waveguide type device for implementing different functions of the optical interference circuit. An optical interference circuit 100 also includes, as major fundamental elements, a VOA 15, a PBS 12, a polarization rotator 13, and 90-degree hybrids 16a, 16b. Further, it also includes a signal light input waveguide 11, a local light input waveguide 14, interfering light output waveguides 18a, 18b, and a signal light monitor waveguide 17. In the optical interference circuit configured by the PLC and including combinations of each of fundamental elements to implement different functions as shown in FIG. 1, the downsizing is an extremely important technical problem.

In implementing the PBS or the polarization rotator in the PLC, a configuration of inserting an optical retardation plate into the optical interference circuit so as to intersect an optical waveguide may be used. The optical retardation plate is an element that causes retardation to an optical signal depending on the polarized wave of the optical signal passing through the optical retardation plate, and further, the optical retardation plate fabricated by using, for example, a polyimide film is widely known.

With reference to FIG. 1 again, in the PBS 12 and the polarization rotator 13, grooves 3 for inserting the optical retardation plates are formed in a manner of intersecting the optical waveguides. The optical retardation plate is inserted into this groove 3 so that light propagating via each of the optical waveguides passes through the optical retardation plate. Due to the configuration including such a groove on the substrate face, it is possible to cause rotation for the light polarization that passes through the optical retardation plate. For instance, in order to configure the PBS 12, a Mach-Zehnder optical interference circuit configured by two optical waveguides may be used for inserting a λ/4 wave retarder into each of the optical waveguides such that their birefringent optical axes are orthogonal to each other. In addition, in order to implement the polarization rotator 13, a λ/2 wave retarder may be inserted such that the birefringent optical axis is in 45-degree direction with respect to a targeted optical waveguide (Non Patent Literature 1).

CITATION LIST

Patent Literature

PTL 1: Japanese Patent No. 2614365

Non Patent Literature

NPL 1: S. Tsunashima, et al., "Silica-based, compact and variable-optical-attenuator integrated coherent receiver with stable optoelectronic coupling system," Nov. 19, 2012/Vol. 20, No. 24/OPTICS EXPRESS 27174

SUMMARY OF INVENTION

However, in the above-described optical waveguide type device which is configured to insert the optical retardation plate into the groove, there has been a problem described below in downsizing a device and improving efficiency of manufacturing processes. The groove for inserting the optical retardation plate in the PLC has been formed, as also disclosed in PTL 1, for example, by machining using a dicing apparatus. At the lower part of FIG. 1, the structure in the vicinity of the groove 3 when viewing a cross section vertical to the substrate face of the optical interference circuit 100 and to the longitudinal direction of the groove 3 is shown. The groove 3 has been machined from the top face of the optical interference circuit to the silicon substrate 1, through a waveguide layer 2 including a core layer and a clad layer in which the optical waveguide is formed, while adjusting a cutting depth to the extent of a predetermined value. However, in such a machining method, other circuits cannot be configured in a work area (work size) for groove machining which depends on the size of a dicing blade. Considering the machining precision of the dicing apparatus itself and a work size required for machining tasks, the periphery of the groove will require a region of prohibiting circuit arrangement over the area of about 1 mm×5 mm.

The dicing blade is extremely large with respect to the optical waveguide and interferes a layout between the work area and each of the fundamental elements, and thus, multiple grooves having different sizes have not been able to be formed on the substrate. If an optical waveguide that does not originally require a groove is cut as a result of a groove formed on the substrate, it will cause a wasteful light loss. In the end, other circuits except for the optical waveguide that requires insertion of a wave retarder have not been able to be closely arranged flexibly within the work area for performing groove machining. In such circumstances, the arrangement of grooves has been firstly prioritized, that is, a single common groove is formed, as shown in FIG. 1, which is shared among optical circuits having different functions that are configured in accordance with this single common groove by using different portions thereof.

As another method of forming the groove 3 of FIG. 1, a laser machining can also be used. However, since the laser machining forms a groove by melting glass (SiO2) with heat, a problem may arise such that stress occurs on a machined portion by thermal contraction or a surface inside the groove roughens. It is difficult to perform machining into a shape that suppresses the light loss in minimum for a wave retarder insertion part, and deterioration in optical properties due to deformation on the optical waveguide part caused by machining is also a concern. Machine processing means of both the dicing and laser has been restraining the downsizing of the optical circuit from the aspects of their machining precision and work area.

As a technique to form a groove on the substrate of the optical interference circuit, wafer processes performed by dry etching or wet etching can also be used. These etching methods are promising as a groove forming method because control can be made to the extent of optical wavelength level in the aspects of both the machining precision and shape control. However, it must be a machining method appropriate for forming a deep groove for inserting a thin film such as an optical retardation plate. Specifically, a machining shape is required to have verticality in a depth direction of the groove, and techniques that suppresses coarseness on the boundary surface between the optical waveguide and the groove and that has a fine tolerance for machining a groove aperture are required. In the configuration example of the optical interference circuit disclosed in Reference 1, since there is a difference in the ratio (selectivity ratio) to be etched between a horizontal direction and a depth direction, the size in the length and width of a groove has been required to have a certain value or more when machining a deep groove with sufficient precision. In a general etching technique for fabricating the optical waveguide, an etching speed vertical to the substrate face in a depth direction is lower than an etching speed parallel to the substrate face in a horizontal direction. Accordingly, in order to form a vertical groove with sufficient depth for inserting the optical retardation plate, there has been necessity to make the width and length of the groove larger than a size originally required for inserting the optical retardation plate. In the end, it has been difficult for using general dry etching or wet etching for fabricating the optical waveguide in forming a small groove for inserting the optical retardation plate thereinto.

Therefore, for instance, when arranging closer to an adjacent optical waveguide by a distance of 500 μm or less, as disclosed in PTL 1, some contrivance such as arranging one continuous groove across a plurality of optical waveguides is required. Particularly, in the case where the optical circuit needs to be downsized, a groove needs to be formed even across an optical waveguide that does not originally require a groove, allowing a loss as an unavoidable event, or, the optical circuit needs to be arranged with some contrivance for a layout to avoid a groove. As such, there has been a considerable restraint in the aspects of the flexibility of circuit designs and the optical performances.

FIG. 2 is a diagram illustrating a problem on a layout of grooves which are formed using a conventional technique. An optical circuit 150 shown in FIG. 2 shows a circuit arrangement in the case where wave retarders 153a to 153f corresponding to a plurality of respective optical waveguides 152a to 152f arranged closely to each other are inserted into one common groove 151 of a conventional technique. In the case of forming a groove in the optical circuit, since signal light propagating via the optical waveguide suppresses reflection at the time of passing through the groove, the boundary face of the groove relative to the propagation direction of the signal light in the optical waveguide is set to an angle larger than 90 degrees, that is, for example, to 98 degrees. An inclination is somewhat emphasized as shown in FIG. 2, but in the case of tilting the groove 151 as such, a certain arrangement area 154 is required in an optical waveguide propagation direction (a horizontal direction in FIG. 2) to form the groove 151 across two or more of the optical waveguides 152a to 152f. For this reason, in the case of making an array by particularly arranging a plurality of optical circuits having predetermined functions to be implemented by inserting the wave retarders, there has been a significant problem that the area of the optical circuit increases. The larger the number of arrays are, the larger the length of the arrangement area 154 in the horizontal direction becomes, and further, the entire size of the optical circuit becomes larger.

Furthermore, in the optical waveguide type device having the configuration in which the optical retardation plate of the conventional technique is inserted into the groove, there has been a problem described below in the aspect of manufacturing processes for inserting and fixing the optical retardation plate. As disclosed in PTL 1, when forming the large common groove across the plurality of optical waveguides, a space to accommodate an extra adhesive has been ensured inside the groove. For this reason, even if excessive adhesives beyond an appropriate amount for fixing the optical retardation plate are introduced at the time of implementation, there has been no possibility that an unnecessary adhesive flows out of the groove to affect other optical elements within the substrate.

Even in the case where appropriate means is implemented as a groove forming method and a small groove can be formed for each of the optical waveguides by arranging adjacent optical waveguides to have a closer distance to each other, another problem arises in the aspect of an assembling process when forming small grooves having different sizes. Specifically, with respect to the small grooves having different sizes, the appropriate amount of adhesive or filler must be set for adhesion and fixation of each of the wave retarders, thereby causing complicated manufacturing processes. If the size of the groove can be set somewhat larger to ensure the volume of the groove for accommodating the adhesive or the like, the manufacturing processes can be simplified by setting the amount of adhesive to be the same, but this is, in the first place, contradictory to the demand in downsizing the grooves and the optical interference circuit.

Recently, a technique of silicon depth machining by improving an etching speed in a depth direction called deep etching has been implemented. Even if it is possible to make an individual groove per optical waveguide due to the improvement in such an etching technique, it is required to optimize and adjust the manufacturing processes individually in order to appropriately accommodate the adhesive or the like in the individual groove when fixing the optical retardation plate. In the manufacturing processes for inserting and fixing the optical retardation plate as well, this has still been a bottleneck in downsizing the optical interference circuit by forming small grooves.

An object of the present invention is to realize, in consideration of the above problems, downsizing an optical interference circuit having a groove for inserting a thin-film element such as an optical retardation plate. Further, a configuration of grooves free from a complicated adjustment process at the time of manufacturing and assembling is also proposed. According to the present invention, the highly-integrated optical interference circuit and optical waveguide type device can be provided.

As one aspect of the present invention, there is disclosed an optical waveguide device which has a plurality of optical waveguides configured on a substrate and into which one or more thin-film elements are inserted substantially vertically to a substrate face by intersecting the optical waveguides, and the optical waveguide device includes grooves that intersect at least two or more respective optical waveguides among the plurality of optical waveguides, wherein each of the grooves includes a rectangular portion into which the thin-film element is inserted, and intersects only one corresponding optical waveguide and does not intersect other optical waveguides adjacent to the one corresponding optical waveguide, and at least two adjacent grooves among the grooves are arranged such that their portions in a respective direction substantially vertical to the one corresponding optical waveguide are facing each other. Here, the substantially vertical direction refers to the longitudinal direction of the groove.

Preferably, the at least two adjacent grooves are arranged such that facing sides of the at least two adjacent grooves are combined via a connected portion of 1 mm or less formed between respective facing end portions of the at least two adjacent grooves.

In addition, at least some of the grooves may further includes at least one extended portion which is continuously formed from an end portion of the rectangular portion.

Furthermore, the extended portion may accommodate an extra adhesive that does not contribute to fixing the thin-film element.

The extended portion may include a first extended portion continuously formed from one end of the rectangular portion toward a longitudinal direction of the rectangular portion, or a second extended portion continuously formed from another end of the rectangular portion toward a direction in which the one corresponding optical waveguide is configured.

Further preferably, the first extended portion may at least partially have a wider shape as getting apart from the one end.

Further, the first extended portion may include a substantial trapezoidal shape having a wider bottom at a side apart from the one end, and the second extended portion may include a triangular shape having a portion in the vicinity of the other end on the long side of the rectangular portion as one side.

In the above-described embodiment, a portion corresponding to a vertex of the shape of the extended portion may be formed in an arc shape having a radius of 50 µm or less.

Also, in the optical waveguide device of the above-described embodiment, the plurality of grooves may be formed, with respect to a material constituting the plurality of optical waveguides, by a deep etching process having a larger selectivity ratio in a depth direction which is vertical to the substrate face.

Further, in the optical waveguide device of the above-described embodiment, any function of Polarization Beam Splitter (PBS), a polarization beam combiner, or a polarization rotator may be implemented by the thin-film element to be inserted into the groove.

As explained above, the present invention realizes downsizing the optical interference circuit having a groove for inserting a thin-film element such as an optical retardation plate. Furthermore, a complicated adjustment process in the manufacturing and assembling processes for fixing the thin-film element may not be needed.

DESCRIPTION OF EMBODIMENTS

Figure 1:
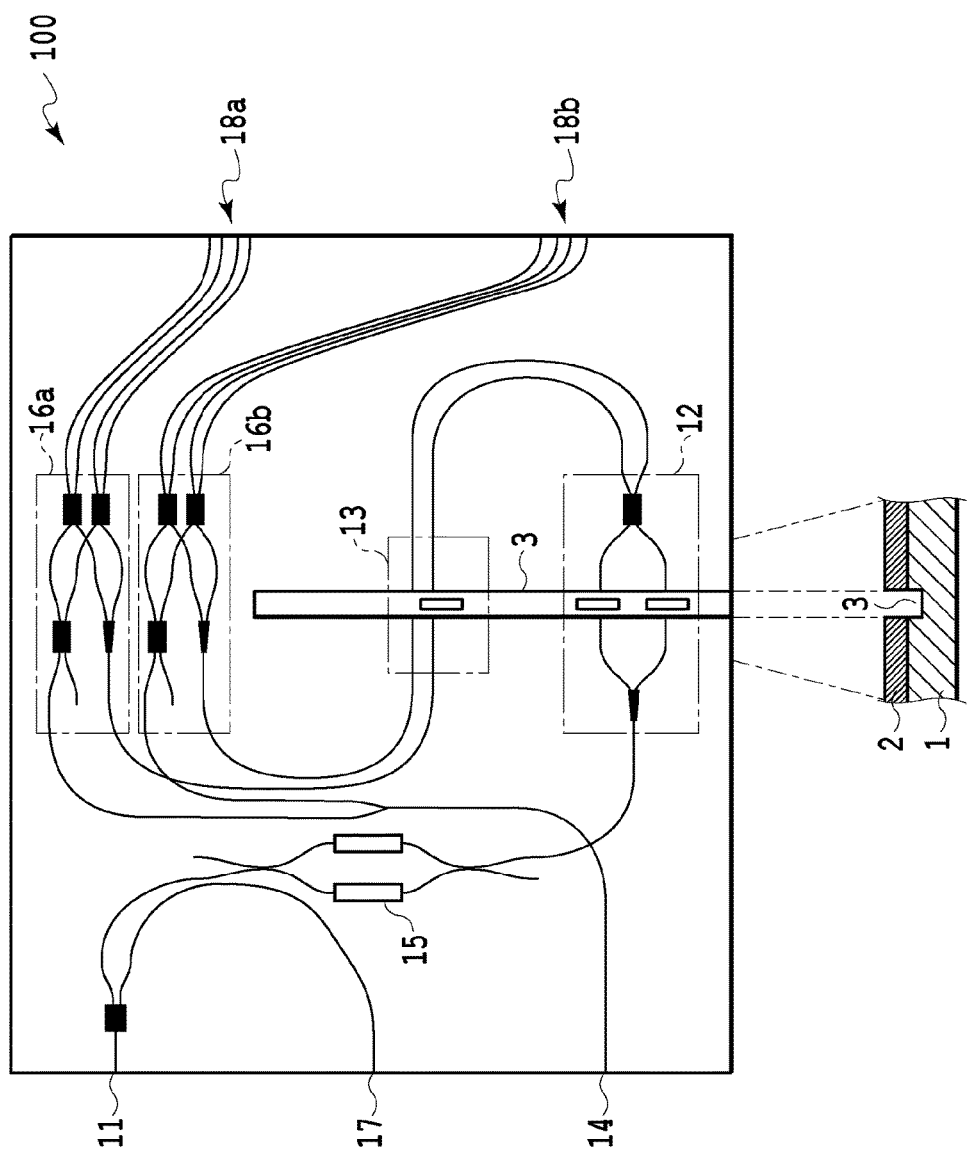
FIG. 1 is a diagram showing a configuration of an optical interference circuit composed of a PLC in an optical receiver of a conventional technique.

In the optical waveguide type device of the present invention, a deep etching technique that has become available along the development of a recent wafer process technique for forming grooves is to be employed. In the wet etching or dry etching technique which has been used for optical waveguide type devices in these days, an etching speed in a vertical direction (a selectivity ratio in a depth direction) has been extremely low compared to an etching speed in a horizontal direction relative to a substrate face. Recently, an etching process having a higher selectivity ratio for the vertical direction of the substrate face, that is, for the depth direction, has been developed, and is widely applied to silicon substrates as Bosch process. In the optical waveguide type device of the present invention, the deep etching technique having a larger selectivity ratio in the depth direction is used for SiO2, which is a material that composes the waveguide, for forming a groove for inserting a thin-film element thereinto. Due to the deep etching technique, it is possible to form a groove which has a size having a minimum aperture required for appropriately inserting the thin-film element and which ensures a sufficient vertical depth.

In the optical waveguide type device of the present invention, it is configured such that at least one groove intersects only one corresponding optical waveguide into which the thin-film element is inserted, and does not intersect other optical waveguides adjacent to this one corresponding optical waveguide. This groove has a substantial rectangular shape, and can be provided in a minimum size which is adapted to the size of the thin-film element to be inserted, thereby allowing the thin-film element to be stably held and fixed in the groove.

As for a groove to be formed in the optical waveguide type device of the present invention, a plurality of grooves formed separately for every thin-film element to be inserted are provided, and at least two of the adjacent grooves are arranged such that their portions in a direction substantially vertical to the optical waveguide are facing each other. Two adjacent grooves may also be connected to each other. Even when the plurality of grooves are connected in one, each of the grooves has a corresponding thin-film element inserted thereinto.

In the optical waveguide type device of the present invention, an extended portion formed continuously from the groove may be included in at least one of the end portions of the groove of a rectangular shape. It is possible to form a groove for each of the plurality of optical waveguides within the optical circuit by selecting an appropriate shape for the groove and the extended portion and making an arrangement for the optical waveguides. The optical waveguide device fabricated according to the present invention can realize further downsizing. The extended portion serves to accommodate an extra filler, adhesive, or the like in the groove, and in the manufacturing processes which make insertion and fixation of the thin-film element, a complicated adjustment process can be simplified.

With reference to the drawings, an explanation on an embodiment of the optical waveguide type device of the present invention will be given below in detail. In the following embodiment, an example of the optical waveguide device using a single-mode optical waveguide of a silica-based material formed on the silicon substrate will be explained. This is because that this configuration is currently widely used in the PLC and is easy for integration, and further, it is excellent in matching with a silica-based optical fiber and can provide a low-loss optical device. However, the following configuration of the groove is not limited only to the single-mode optical waveguide of the silicon substrate and silica-based material, but may be applied to the optical device having a configuration in which grooves are formed on the substrate face to insert the thin-film elements onto the substrate.

First Embodiment

Figure 3:
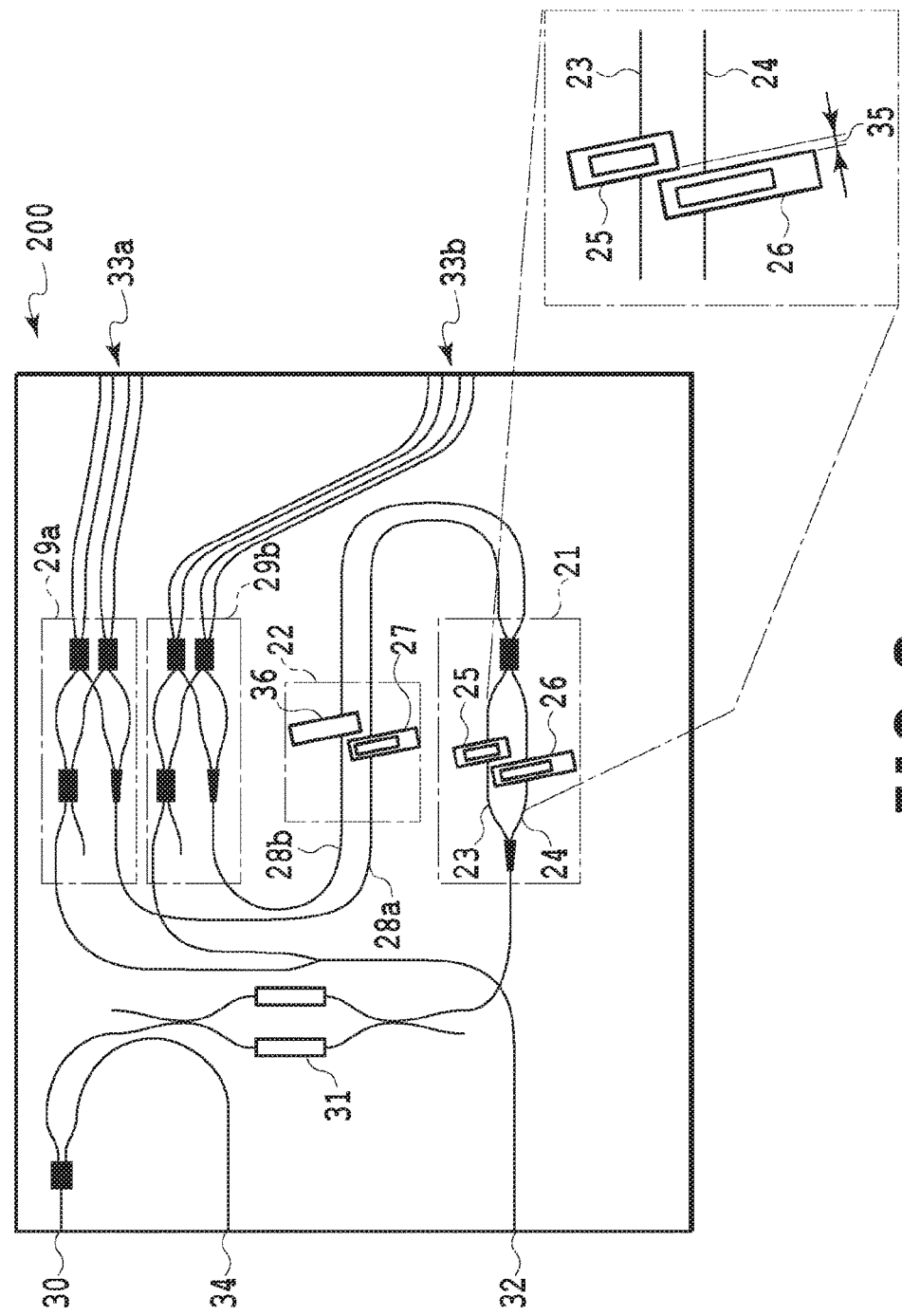
FIG. 3 is a diagram showing a configuration of an optical waveguide device of a first embodiment of the present invention.

FIG. 3 is a diagram showing a configuration of an optical waveguide device of the first embodiment of the present invention. The optical waveguide type device of FIG. 3 is an optical interference circuit 200 of a digital coherent optical transmission receiver which is composed of the PLC. The optical interference circuit 200 includes a signal light input waveguide 30, a local light input waveguide 32, interfering light output waveguides 33*a*, 33*b*, and a signal light monitor waveguide 34. In addition, the optical interference circuit 200 includes, in the order of propagating a signal light, a VOA 31, a PBS 21, a polarization rotator 22, and two 90-degree hybrids 29*a*, 29*b*. The PBS 21 and polarization rotator 22 are implemented by inserting wave retarders, which are thin-film elements, into the respective grooves so as to intersect the respective optical waveguides.

The PBS 21 is configured such that two λ/4 wave retarders are inserted into grooves 25, 26 formed on two arm waveguides 23, 24, respectively, of a Mach-Zehnder interferometer in a manner in which their birefringent optical axes are orthogonal to each other. The PBS 21 functions so as to split the inputted signal light into two polarized waves. Further, the polarization rotator 22 is configured such that a λ/2 wave retarder is inserted into a groove 27 formed on an optical waveguide 28*a* out of two optical waveguides 28*a*, 28*b*. After splitting the signal light into two polarized waves by the PBS 21, the polarization rotator 22 rotates one of the optical polarized waves by 90 degrees. The optical waveguides 28*a*, 28*b* arranged adjacently in the polarization rotator 22 are arranged closely so that their interval is 500 μm. In the polarization rotator 22, the optical waveguide 28*b* which is on the side in which no wave retarder is to be inserted has a groove 36 formed thereat, similar to the groove 27. Accordingly, the optical signals which have been polarization-split by the PBS 21 are made to cause substantially the same excess loss. Even in such a case, the grooves can be arranged at required locations in a minimum region.

The grooves 25, 26, 27 into which the thin-film elements are to be inserted and the groove 36 into which the thin-film element is not to be inserted are both formed by using the deep etching technique which is optimized for depth etching of SiO2. The size of the groove is designed in accordance with the size of a wave retarder to be inserted depending on each of the functions. As to the groove 25 of the PBS 21, its length is set to 1 mm and the λ/4 wave retarder having the length of 0.75 mm is inserted. As to the groove 26, its length is set to 2 mm and the λ/4 wave retarder having the length of 1.8 mm is inserted. The reason why the two λ/4 wave retarders have different lengths is that one λ/4 wave retarder is vertically inserted and the other λ/4 wave retarder is inserted in parallel relative to the optical axis corresponding to the λ/4 wave retarder of a rectangular shape in a length direction in order to generate retardation on the orthogonal polarized waves depending on each of the optical axes. Further, as to the groove 27 of the polarization rotator 22, its length is set to 1.5 mm and the λ/2 wave retarder having the length of 1.0 mm is inserted. All the wave retarders have the substantial length of about 1 mm in minimum in consideration of readiness to work at the time of assembling. As to the groove 36 into which the wave retarder is not to be inserted in the polarization rotator 22, its length is also set to 1.5 mm.

In FIG. 3, the layout of the optical waveguide is substantially close to an image of an actual device, but it should be noted that an actual configuration differs in terms of the width and length, for example, of the groove relative to the optical waveguide. If actual dimension relations are depicted, the grooves, wave retarders, and the like will be invisible, and thus, the widths of the grooves and the thicknesses of the wave retarders are relatively enlarged and exaggerated.

The thin-film element used as a wave retarder is composed of a polyimide film, and the one having a thickness of about 10 μm is used. In accordance with the thickness of the thin-film element to be inserted, the width of the groove is set to be about 15 to 30 μm. By filling a resin having a refractive index close to silica glass into a clearance between the groove and the thin-film element therein for adhesion and fixation of the thin-film element inserted into the groove, the excess loss on the optical waveguide intersecting the groove is suppressed to a minimum. The depth of the groove is 100 μm or more and 300 μm or less, and an etching cross section of the optical waveguide portion is kept in verticality relative to the substrate face in a vertical direction, and its surface is smooth. The thin-film element has, considering easy handling at the time of assembly, a height which protrudes upward from the substrate surface by about 500 μm.

The groove according to the optical waveguide device of the present invention is formed as an individual groove for an optical waveguide that requires inserting a thin-film element. Here, it should be noted that the individual groove refers to one groove corresponding to one optical waveguide that requires inserting the thin-film element in a one-to-one correspondence, but does not refer to a structurally separated groove. Further, the grooves 25, 26 are arranged in a manner of intersecting their respective corresponding optical waveguides only, and not in a manner of intersecting other optical waveguides closely arranged thereto. Furthermore, in the optical waveguide device of the present invention, the adjacent grooves 25, 26 are arranged such that their portions in a direction vertical to the direction of the optical waveguides 23, 24 (a horizontal direction in FIG. 3) are facing each other. The same applies to the grooves 27, 36.

Therefore, the optical waveguide device of the present invention can be carried out such that: in an optical waveguide device having a plurality of optical waveguides configured on a substrate and including one or more thin-film elements being inserted substantially vertically relative to a substrate face intersecting the optical waveguide, the optical waveguide device including grooves (25, 26, 27, 36) respectively intersecting at least two or more optical waveguides (23, 24, 28a, 28b) out of the plurality of optical waveguides, wherein each of the grooves includes a rectangular portion (52) into which the thin-film element is inserted and configured so as to intersect only one corresponding optical waveguide and not to intersect other optical waveguides adjacent to the one corresponding optical waveguide, and at least two adjacent grooves (25, 26) out of the plurality of optical waveguides are arranged such that their portions in a direction vertical to the one corresponding optical waveguide are facing each other.

In the above-described optical waveguide device of the present invention, the plurality of grooves are arranged such that they are deviated along the directions of the optical waveguides and the portions of the grooves in a direction vertical to the optical waveguides are facing each other. In other words, for instance, when viewing the two grooves 25, 26 along the direction of the optical waveguides 23, 24, portions of two groove projections on axes (or on axes along the longitudinal direction of the grooves) substantially vertical relative to the optical waveguides overlap each other, and accordingly, the interval between the adjacent optical waveguides 23, 24 can be set to be smaller. There is no need to arrange the plurality of wave retarders in an array along one common groove as in the configuration of the conventional technique shown in FIG. 2, and no wasteful space is required in a region for arranging the wave retarders. Accordingly, the size of the optical circuit can be set to be smaller than that of the conventional technique in both the signal light propagating direction and its vertical direction in the optical waveguide. In the following explanation, a distance between two grooves are defined as shown in an enlarged view in the lower right part of FIG. 3. In other words, the distance between the two grooves is a minimum distance 35 from one side of the groove 25, which is one of the two adjacent grooves, to one side of the groove 26, which is the other one of the two adjacent grooves, that faces the side of the groove 25. Further, the direction substantially vertical to the optical waveguide direction corresponds to the longitudinal direction of the groove. As described above, each of the grooves is set to have an angle of 98 degrees, for example, by tilting slightly from 90 degrees (vertical direction) relative to the optical waveguide in order to suppress reflection loss. Therefore, it can be said that at least two adjacent grooves among the plurality of grooves in the present invention are arranged such that the portions of the groove projections on the axes in the longitudinal directions of the grooves overlap each other.

The two grooves may be combined with a distance therebetween of 1 mm or less by combining two grooves via a connected portion. In the case of forming the two grooves closer, an intensity on a portion pinched by the facing faces of the two grooves becomes low, and thus a crack is likely to occur. By combining the two adjacent grooves via the connected portion, the portion having low intensity is eliminated, and thus the intensity of the groove structure can be prevented from deterioration.

Figure 7A:
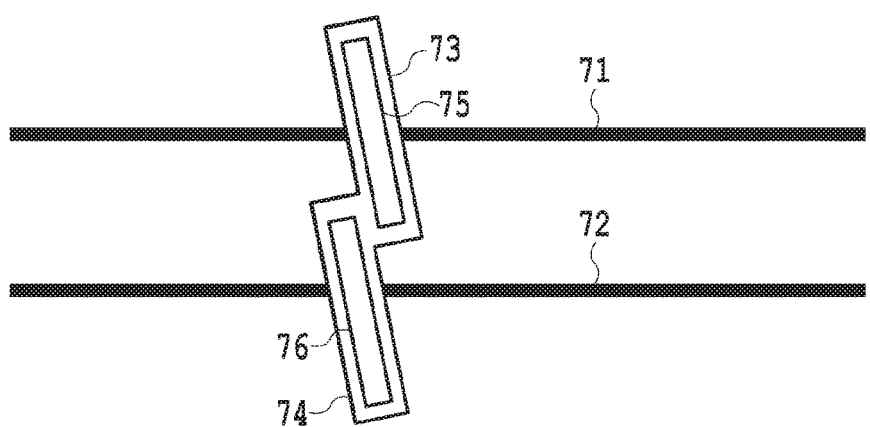
FIG. 7A is a diagram showing a first configuration example in which two adjacent grooves are combined together.
Figure 7B:
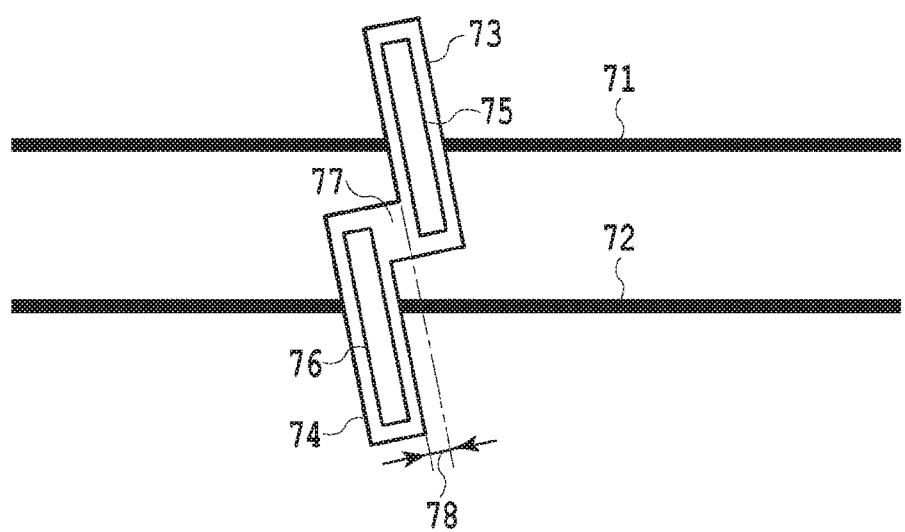
FIG. 7B is a diagram showing a second configuration example in which the two adjacent grooves are combined together.
Figure 7C:
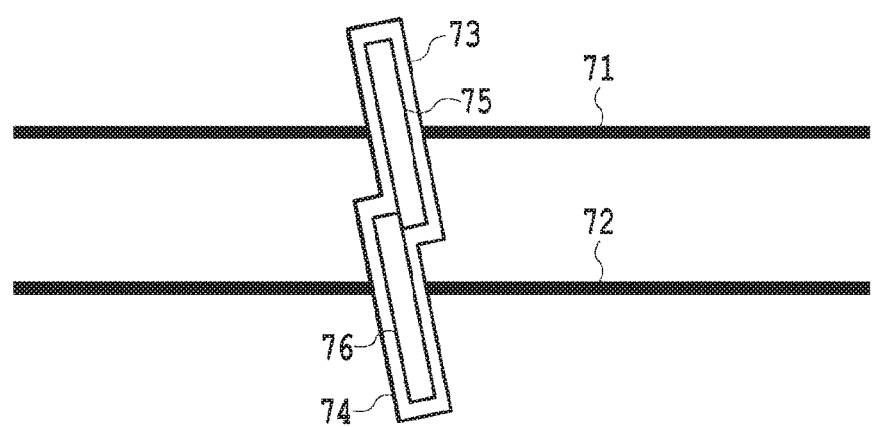
FIG. 7C is a diagram showing a third configuration example in which the two adjacent grooves are combined together.

FIGS. 7A to 7C are diagrams each showing a configuration example in which two adjacent grooves are combined together. FIG. 7A shows a configuration example in which the two adjacent grooves 73, 74 are arranged such that their facing sides are in contact with each other. A side of one groove 73 of the rectangular shape and a facing side of the other groove 74 of the rectangular shape are on the same line, and the two grooves are combined such that the two rectangles are in contact with each other. In this case, the distance between the two grooves is 0. FIG. 7B shows a configuration example in which the two adjacent grooves 73, 74 are combined together via a connected portion 77 formed between each of the end portions of the grooves. The length of the connected portion 77, that is, a distance 78 between the two grooves can be substantially set to 1 mm or less. FIG. 7C shows a configuration example in which the two adjacent grooves 73, 74 are arranged such that the part of their facing end portions overlap each other. One end of a rectangular shape area in one groove 73 and a facing end of a rectangular shape area in the other groove 74 are overlappingly combined such that the two wave retarders 75, 76 are in contact with each other. In this case, the distance between the two grooves has a negative value. In both cases, two grooves are combined together, and, as will be described later, the filler, adhesive, or the like to be introduced into the groove for fixation and adhesion of the wave retarder reaches inside the two grooves. By combining the above-described two or more connected grooves with an extended portion shown in FIGS. 5A and 5B, which will be described later, so as to reduce the number of grooves, the configuration of connected grooves shown in FIG. 7A to FIG. 7C has an advantage in the aspect of simplifying a process itself for introducing the adhesive or the like to be introduced into the groove.

A deep etching process for fabricating the groove for the optical waveguide device of the present invention is a process optimized for performing depth etching on SiO2 of the optical waveguide portion. Therefore, in the etching cross section other than the optical waveguide portion, that is, particularly in the etching cross section of the groove reaching the silicon substrate portion beyond the optical waveguide portion made of SiO2, a strict verticality relative to the substrate face is not necessarily required. As long as the verticality in the etching cross section of the optical waveguide portion made of SiO2 that causes a phase change for the signal light is ensured, the thin-film element can be sufficiently held in the groove made of SiO2. Therefore, the etching cross section of the silicon substrate located deep inside the groove is allowed to be slightly deviated from a vertical state. By using the deep etching process which implements the groove having the size of an aperture sufficiently required for inserting the wave retarder (the width of the groove) and the groove that allows verticality and smoothness in the etching cross section of the optical waveguide portion, a structure having a fabrication tolerance sufficient for holding and fixing the thin-film element can be implemented.

Figure 5A:
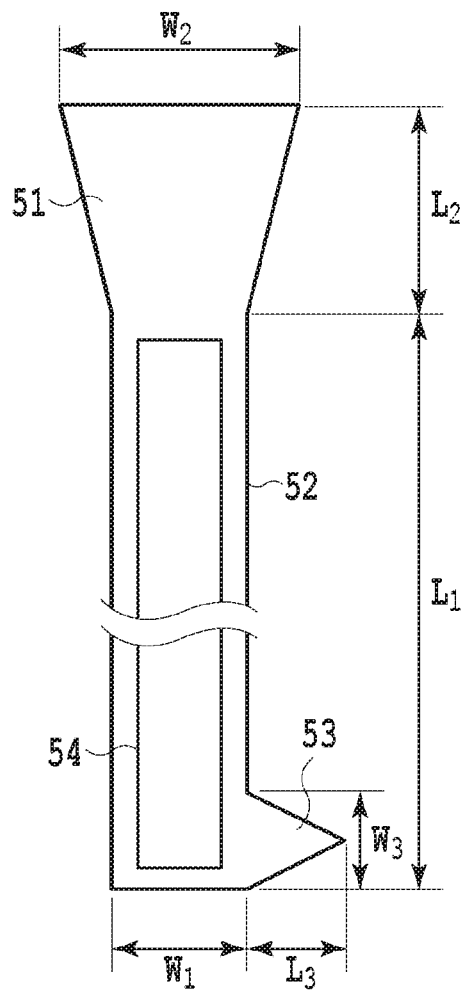
FIG. 5A is a diagram illustrating a shape of a groove in more detail in the optical waveguide device of the present invention.
Figure 5B:
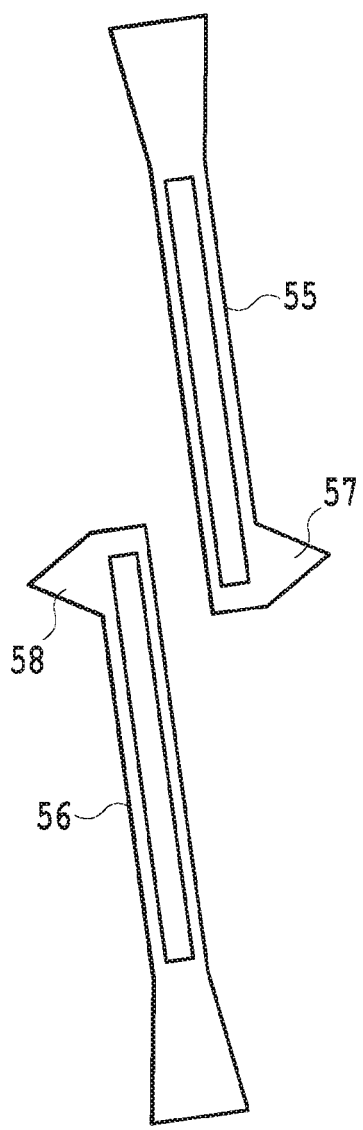
FIG. 5B is another diagram illustrating a shape of a groove in more detail in the optical waveguide device of the present invention.

FIG. 5A and FIG. 5B are diagrams each illustrating a shape of a groove in more detail in the optical waveguide device of the present invention. FIG. 5A shows the shape of the groove viewing the substrate face of the optical waveguide device, and shows both end portions of the groove while omitting the central portion of the groove. Although no detail has been given on the entire configuration diagram of FIG. 2, in the optical waveguide device of the present invention, the groove into which the thin-film element is inserted includes a rectangular portion 52 into which a thin-film element 54 is inserted and accommodated, and one or more extended portions which are continuously formed from at least one end portion of the rectangular portion 52.

Specifically, one end portion of the rectangular portion 52 has a first extended portion 51 formed thereon in a substantial trapezoidal shape extending along the longitudinal direction of the rectangular portion 52. Furthermore, in the other end portion of the groove, a second extended portion 53 in a triangular shape extending substantially toward the same direction as the optical waveguide that intersects this groove can be formed.

Therefore, the groove according to the optical waveguide device of the present invention includes the rectangular portion 52 into which the thin-film element is inserted and at least one extended portion continuously formed from the end portion of the rectangular portion. Further, this extended portion includes a first extended portion (51) continuously formed from one end of the rectangular portion toward the longitudinal direction of the rectangular portion or the second extended portion (53) continuously formed from the other end of the rectangular portion toward a direction in which the one corresponding optical waveguide is configured. In addition, the first extended portion may have a substantial trapezoidal shape having a wider bottom at a side apart from the one end, and the second extended portion may have a triangular shape having a portion in the vicinity of the other end on the long side of the rectangular portion as one side.

The first extended portion 51 and the second extended portion 53 continuously formed by extending from the end portions of the rectangular portion 52 are formed for respectively accommodating the adhesive (filler) to be filled when fixing a wave retarder 54 or the like to be inserted into the groove. Since the groove for the optical waveguide device of the conventional technique has been a large-sized common groove shared among the plurality of thin-film elements for insertion, there has been enough space (volume) for accommodating extra adhesive inside the groove. The groove for the optical waveguide device of the present invention is formed so as to achieve a compact size as much as possible within a range allowed for inserting and fixing the thin-film element with respect to each of the optical waveguides that requires to have a groove. Therefore, each of the grooves desirably includes a material-accommodating function which accommodates extra adhesive that does not contribute to fixing the thin-film element.

By determining the shapes of the first extended portion 51 and the second extended portion 53 based on the shape of the thin-film element to be used or the volume of the rectangular portion, the accommodating volume of the adhesive or filler can be set for the entire groove including each of the extended portions. The volume of each extended portion is determined based on the size of the rectangular portion 52 of the individual groove to be formed on the circuit. The size of the rectangular portion 52 of the groove is determined by considering the length and thickness of the thin-film element to be inserted into the groove and volume variations (e.g., depth and width W1) occurred in the etching process for forming the groove. The size of each extended portion is set, based on the volume of the rectangular portion 52 as determined above, in further consideration of properties (e.g., viscosity and thixotropy) and amounts of the adhesive to be filled, such that the entire volume inside the groove including each of the extended portions is substantially the same for each groove in the optical circuit. If the property of the adhesive is appropriately selected, the sufficient adhesive required for adhesion and fixation of the thin-film element thoroughly reaches the rectangular portion in which the thin-film element is to be held and the extra adhesive is accommodated in the extended portions, which may therefore serve as a buffer for the amount of adhesives, that is, the material-accommodating function.

As such, by determining the shapes of the first extended portion 51 and the second extended portion 53, even if the sizes of the thin-film elements for individual grooves are different and the volumes at the time of groove formation by etching vary, there is no need to adjust the amount of adhesive individually for every groove. Since there is no need to change the predetermined amount of filling adhesive for every groove, the process of filling the adhesive is simplified and defects caused by the excess and deficiency of the adhesive are reduced, thereby realizing improvement in the yields of the optical waveguide devices. Therefore, by providing at least one extended portion on the groove for the optical waveguide device of the present invention to include the buffer for the adhesive, that is, the material-accommodating function, the complicated manufacturing processes can be avoided while realizing downsizing the groove itself.

Figure 2:
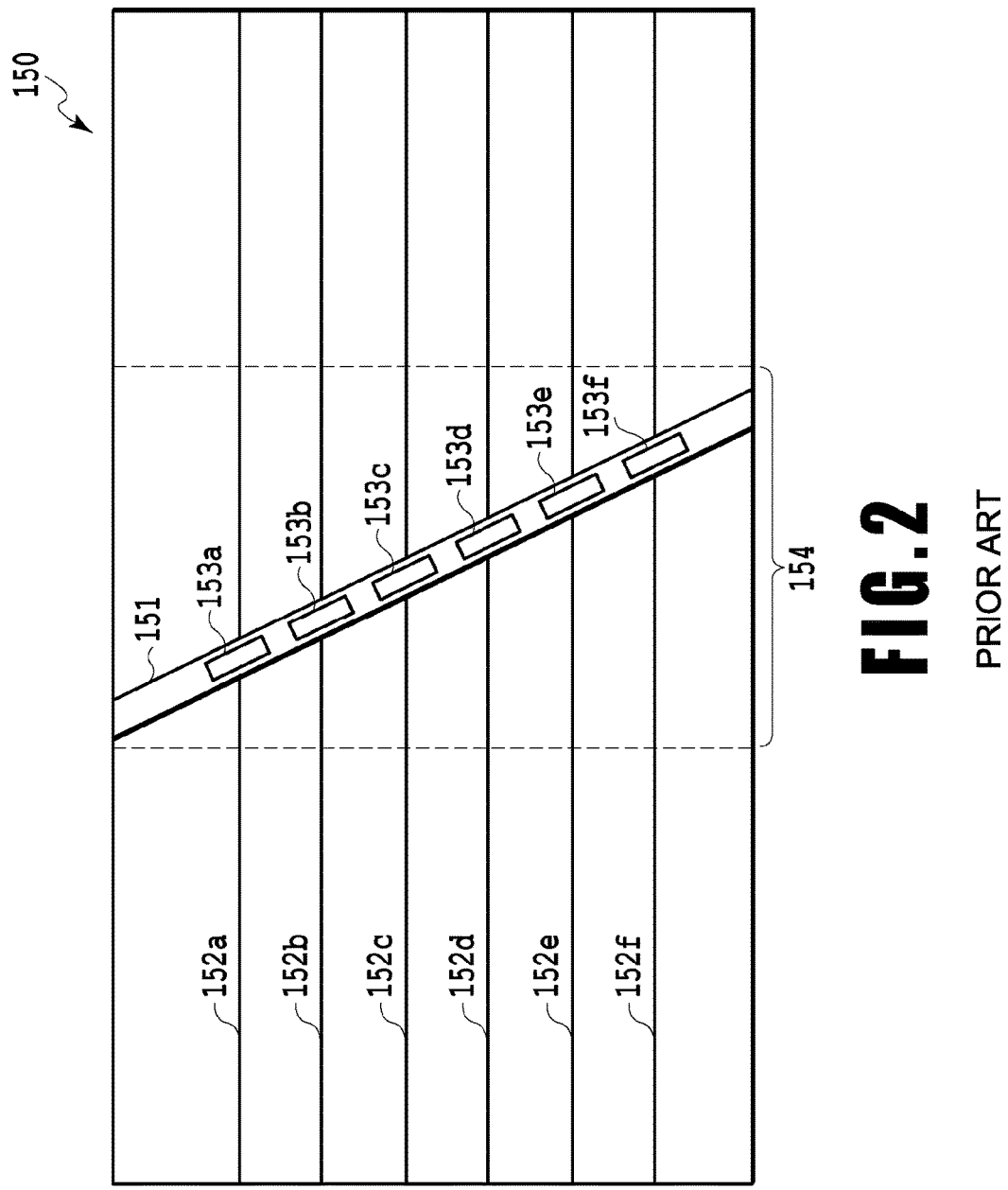
FIG. 2 is a diagram illustrating a problem on a layout of grooves which are formed using a conventional technique.

Therefore, in the groove in the optical waveguide circuit of the present invention, at least some of the plurality of grooves may further include at least one extended portion (51, 53) formed continuously from the end portion of the rectangular portion, wherein its shape is determined based on the shape of at least the thin-film element to be inserted and the volume of the rectangular portion. In the optical waveguide device of the present invention, as the simplest configuration, as shown in FIG. 2, the two grooves may be configured to be located adjacently. It is possible to further configure three or more grooves adjacently and adjacent two grooves may be arranged as one group by arranging portions of the grooves in a direction vertical to the optical waveguide to face each other. In such a case, the grooves are combined as shown in FIG. 7A to FIG. 7C and an extended portion is appropriately provided from the rectangular portion of the groove at the end side of the three or more grooves to implement the buffer for the adhesive, that is, the material-accommodating function. In this case as well, the shape of the extended portion may be determined based on the shape of the thin-film element to be inserted and the volume of the plurality of combined rectangular portions.

The extended portions 51, 53 are formed at the same time as forming the rectangular portion 52 by etching, and their forms are selected and arranged so as not to affect a signal light entering the thin-film element 54 to be inserted. The groove is formed in a direction in which the thin-film element to be inserted into the groove intersects the optical waveguide. An optical waveguide in which a groove is to be formed and another optical waveguide most adjacent thereto are arranged so that the interval between these two optical waveguides is as small as possible. Therefore, the other adjacent optical waveguide can be arranged on the end portion side in which the second extended portion 53 extending toward a direction in which the optical waveguide is configured is formed. The first extended portion 51 extending toward the longitudinal direction of the rectangular portion 52 is extended toward the adjacent optical waveguide, and therefore, it is not suitable in the case where the optical waveguides are arranged with a smaller interval. In the case where the grooves are not combined, the entire layout of the optical interference circuit may be determined so that the adjacent waveguide is to be arranged on the second extended portion side which extends toward the direction in which the optical waveguide is configured.

In the case of the groove arrangement examples by connecting two or more grooves as shown in FIG. 7A to FIG. 7C, an extended portion may be configured at the grooves disposed at the both end portions of the connected grooves. Further, if no obstacle exists in the stable adhesion and fixation of the wave retarder and in the optical property of the optical waveguide, an extended portion extending toward a direction in which the optical waveguide is configured may be provided in a groove disposed amid the plurality of connected grooves.

FIG. 5B is a diagram showing the configuration of extended portions which are formed in the case where two grooves are closely arranged without connection therebetween. In the case of closely arranging two grooves 55, 56, they may be arranged such that their respective portions in a direction vertical to the direction of the optical waveguide are facing each other and that the second extended portions 57, 58 are disposed back to back. One second extended portion 57 is formed on the opposite side of the facing groove 56 and the other second extended portion 58 is formed on the opposite side of the facing groove 55. Accordingly, the second extended portions 57, 58 are not obstacles when closely arranging the two grooves 55, 56.

In FIG. 5A, as to the first extended portion 51 and the second extended portion 53, both of the extended portions may be provided for one groove or either one of them may be provided therefor as long as the material-accommodating function to accommodate extra adhesives can be implemented. Further, in the case of configuring two or more grooves to be connected as shown in FIG. 7A to FIG. 7C, an extended portion may be provided in grooves at the both ends among the connected grooves. As long as the appropriate volume of accommodating a filler (adhesive) is ensured, any combination may be employed. In the case where two grooves are separated as shown in FIG. 5A, the extended portion having a shape and size that considers the volume of a rectangular portion and an extended portion for each groove and the shape of a wave retarder may be provided in order to simplify the setting of the amount of the adhesive or the like. When the plurality of grooves are connected as shown in FIG. 7A to FIG. 7C, the number of grooves into which the adhesive is to be filled may be reduced as well. Therefore, as shown in FIG. 3, by arranging two or more grooves such that their portions in a direction vertical to the waveguide are facing each other and by further forming extended portions depending on the state of arranging and combining the plurality of grooves, a compact and flexible layout of optical waveguides and grooves as well as simplified processes of adjusting the amount of adhesive in the process of wave retarder adhesion and fixation can be implemented. Connecting the plurality of grooves will be efficient in that the number of grooves requiring adjustment in the filling of the adhesive and the amount thereof can be reduced, and simultaneously, the amount of adhesive required for one groove can be suppressed to the minimum. Thus, it is in contrast to the case of forming one large groove 151 of the conventional technique as shown in FIG. 2.

The first extended portion 51 extending in the longitudinal direction of the rectangular portion has been explained to be in a trapezoidal shape, but the shape is not at all limited to this shape as long as the problem of a crack to be described later does not arise and the shape is not contradictory to the downsizing of the optical circuit. Therefore, as long as the extra adhesive can be accommodated, the shape of the first extended portion 51 excluding the rectangular portion is not limited to the trapezoidal shape as shown in FIG. 5A, and may be in any polygon having three or more sides such as a triangle, a square, a quadrangle, and a pentagon, and further, any shape including a curved surface on at least a portion of the shape. Similarly, the second extended portion 53 extending in a direction in which the optical waveguide is configured is not also limited to a triangular shape, but may possibly be in any shape as long as not affecting the fixation of the thin-film element 54 in the groove. In other words, the shape of the second extended portion 53 excluding the rectangular portion is not limited to the triangular shape shown in FIG. 5A, but may be in any polygon having three or more sides such as a square, a quadrangle, and a pentagon, and further, any shape including a curved surface on at least a portion of the shape. Further, the first extended portion has been explained to be extended along the longitudinal direction of the rectangular portion 52, but by providing a middle portion between the rectangular portion 52 and the extended portion 51 of a trapezoidal shape for bending a direction, the distance between adjacent optical waveguides can be taken by bending the extending direction of the trapezoidal extended portion 51.

As for the first extended portion, in order to ensure the volume for accommodating the adhesive, it is preferable that the first extended portion at least partially have a wider shape as getting apart from the one end.

Figure 6:
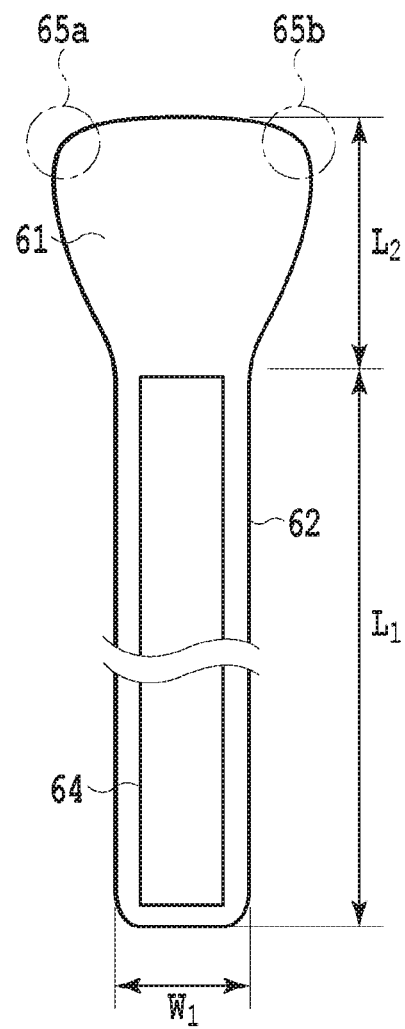
FIG. 6 is a diagram illustrating another shape of a groove in the optical waveguide device of the present invention.

FIG. 6 is a diagram illustrating another shape of a groove in the optical waveguide device of the present invention. In the configuration example of FIG. 6, an extended portion 61 is formed, with respect to the rectangular portion 62 of the groove, from one end along the longitudinal direction of the groove. The extended portion 61 has a substantial trapezoidal shape, but corners at vertex portions are smoothly rounded. For instance, vertex portions 65a, 65b at the outermost end of the groove has a shape close to an arc having the radius of 10 to 50 µm. If a radical shape fluctuation exists on the contour of the groove, there may be a case where a crack occurs on this portion. By making the shapes of vertex portions to be rounded as shown in FIG. 6, the reliability of the device is improved. It is needless to say that the shape rounded as an arc shape can also be applied to the vertex portions of the second extended portion 53 shown in FIG. 5A.

The thin-film element having a function as an optical retardation plate has a shape close to a substantial rectangle or square. The thin-film element has, considering the readiness of handling, the length of approximately 1 to 2 mm in a direction along the groove and the thickness of about 10 µm. The rectangular portions 52, 62 of the grooves have the width W1 of about 15 to 30 µm and have the groove depth of about 100 to 300 µm. Each of the extended portions exemplified as shown in FIG. 5A, FIG. 5B, and FIG. 6 can be realized in the following sizes: that is, the length L2 of the first extended portions 51, 61 is about 50 to 400 µm, the width W2 of the long side of the trapezoid is about 30 to 300 µm, and the length L3 and width W3 of the second extended portion 53 are both about 50 to 200 µm. Each of the above values possibly varies according to the size of a thin-film element, the conditions of deep etching, the depth of a groove, the property of an adhesive, and the like, and the present invention is not intended to limit only to the range of the above values.

Here, with reference to FIG. 3 again, according to the optical waveguide device of the present invention, the PBS 21, the polarization rotator 22, and the 90-degree hybrids 29a, 29b are arranged while folding optical waveguides that connect each of the above. By setting the radius of folded curve lines of the optical waveguides to a minimum value so as not to generate radiation loss, the three fundamental elements are roughly placed in rows in a longitudinal direction and arranged closely to each other. By closely arranging two optical waveguides 23, 24 which correspond to the arm portion of Mach-Zehnder interferometer, together with the characteristic grooves 25, 26, in the PBS 21 so as to have an interval of 300 µm or less, it is possible to considerably reduce the size of the entire circuit. Incidentally, if a long groove is required to be formed for the size of the wave retarder, for instance, it is possible, as required, to set the interval between the two optical waveguides 23, 24, which correspond to the arm portion, to be larger as to about 1 mm, and thus, the interval between the waveguides are not limited to the above values, either.

As described above, a problem of the increase in an arrangement space when the boundary faces of the grooves are tilted relative to the optical waveguides as explained in FIG. 2, a restraint on an optical circuit layout for avoiding the passage of a groove, and a problem of the occurrence of an undesirable loss caused by allowing the passage of a groove can be resolved. Simultaneously, by appropriately providing an additional extended portion to the rectangular portion of the groove, the complicated processes of setting and adjusting the amount of an adhesive in the process of inserting and fixing the wave retarder can be avoided. By providing an extended portion for the plurality of connected grooves, it is possible to reduce the number of grooves required for adjusting the filling of the adhesive and the amount thereof and to also reduce the number of processes for introducing the adhesive.

Specifically, in the optical receiver in the digital coherent optical transmission system shown in FIG. 1, the size of a chip is 17×9 mm in the case of forming one large common groove in the optical interference circuit. Meanwhile, in the optical waveguide device of the present invention shown in FIG. 3, the size of a chip is 12×7 mm for implementing the same function as that in FIG. 1 in the case of forming individual grooves for required optical waveguides. The use of the characteristic configuration of the groove in the optical waveguide device of the present invention allows to reduce an area by 45% compared to that of the configuration of the conventional technique.

Along with the decrease in the size of the optical circuit in the optical waveguide device of the present invention, light reflex generated on the boundary face between the optical waveguide and the groove for inserting the thin film may possibly influence a performance as the optical receiver. In order to sufficiently suppress the amount of light reflex attenuation, as shown in FIG. 3, the grooves 25, 26, 27, and 36 are each configured such that an angle of the boundary face between the optical waveguide and the groove is 98 degrees. By setting the direction of the groove to a certain angle larger than a right angle, the adjacent grooves 25, 26 are arranged such that their portions in a direction vertical to the optical waveguide are facing each other and are arranged to have a layout such that each of the grooves intersects only one corresponding optical waveguide. In other words, the groove in the optical waveguide device of the present invention intersects only the corresponding optical waveguide and does not intersect other optical waveguides closely arranged.

The optical waveguide device of the present invention allows reducing the size of the optical circuit by only changing the shapes of the grooves with the use of the deep etching technique, while using a conventional technique for optical waveguide designing. On the other hand, as to the optical properties of the optical interference circuit such as insertion loss, a polarization extinction ratio in the PBS, a phase error in the 90-degree hybrid, and a common mode rejection ratio, it is possible to obtain performances completely equivalent to those of the case of the optical circuit in a conventional technique.

As described above, in the optical waveguide device of the present invention, by providing a characteristic configuration of the groove, considerable restraint on circuit designing relating to the layout of grooves as well as on optical performances is resolved and the remarkable downsizing of the optical circuit is realized. Further, even if the number of grooves increases, a problem of complicated manufacturing and assembling processes does not occur. In the following embodiment, a configuration example of the optical interference circuit which allows effective use of the characteristic groove in the optical waveguide device of the present invention will also be described.

Second Embodiment

Figure 4:
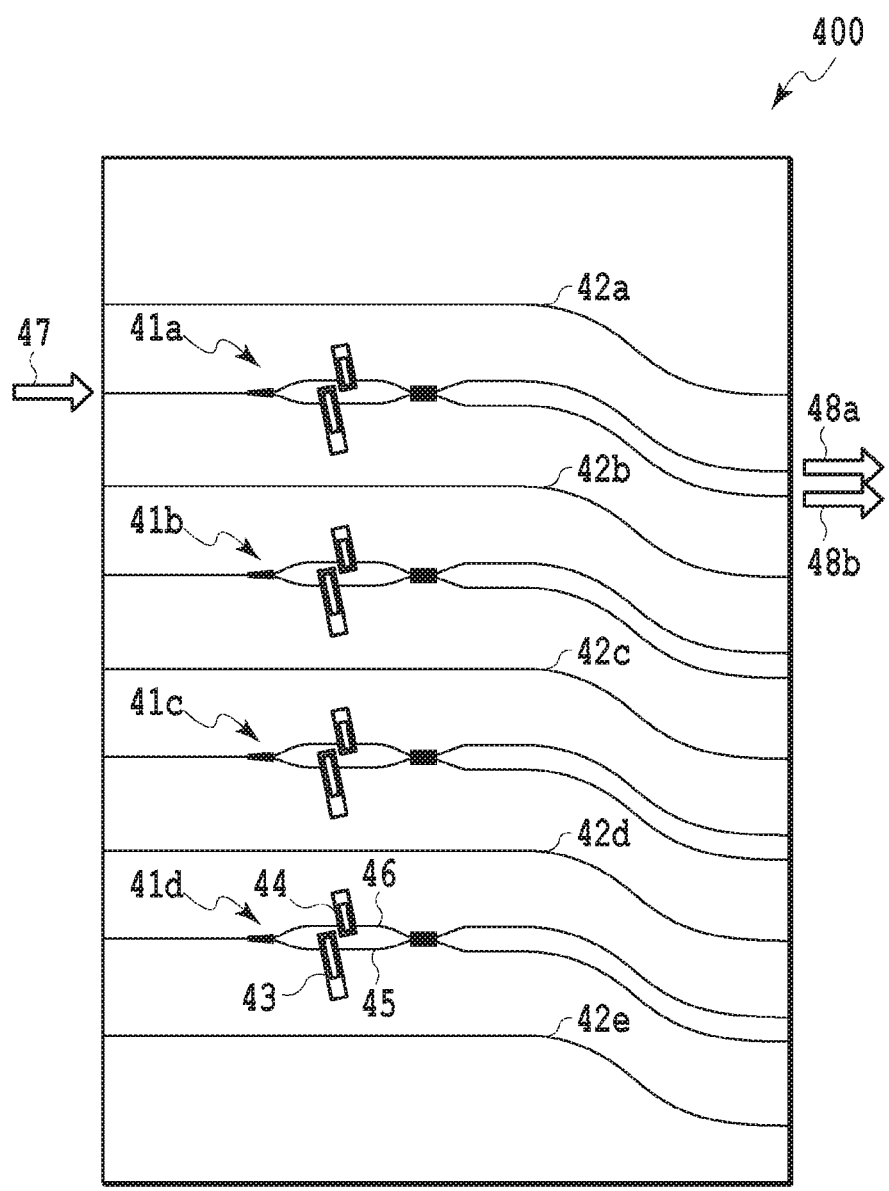
FIG. 4 is a diagram showing a configuration of an optical waveguide device of a second embodiment of the present invention.

FIG. 4 is a diagram showing a configuration of an optical waveguide device of the second embodiment of the present invention. FIG. 4 shows a PBS array circuit 400 including a plurality of arrayed PBSs 41a to 41d and a plurality of optical waveguides 42a to 42e of a through-connection that does not specify usage on both sides of each PBS. A signal light 47 is inputted into each input waveguide of the PBS and split into two polarized waves by the PBS in a horizontal direction of the substrate and a vertical direction of the substrate, and output lights 48a, 48b are outputted from two output optical waveguides. In a single PBS, an interval between two optical waveguides 45, 46 which correspond to the arm waveguides of Mach-Zehnder interferometer is set to 300 µm.

In the optical waveguide device of the present embodiment, a λ/4 wave retarder is inserted in each of the optical waveguides 45, 46 in each PBS. In order to suppress the amount of light reflex attenuation caused by reflection in grooves 43, 44 for inserting the wave retarders, an angle of the boundary face between the optical waveguide and the rectangular shaped groove is arranged to be 98 degrees. Both of the grooves 43, 44 are configured to intersect only one of the optical waveguides of the arm waveguides passing through the respective grooves, and are not configured to intersect the other one of the optical waveguides of the arm waveguides arranged closely or further, the plurality of optical waveguides 42a to 42e of through-connections.

The grooves 43, 44 are formed by using the deep etching technique, which is a process optimized for performing depth etching on the waveguide portion made of SiO2. One groove 43 is set to have a length of 1 mm, and a λ/4 wave retarder having the length of 0.75 mm is inserted thereinto. The other groove 44 is set to have a length of 2 mm, and a λ/4 wave retarder having the length of 1.8 mm is inserted thereinto. As for a thin-film element used for a wave retarder, a polyimide film is adopted, and the one having a thickness of about 10 µm is used. The width of the groove for inserting the thin film is set to about 15 to 30 µm, and the excess loss on the optical waveguide that passes through the groove is suppressed to a minimum by using a resin having a refractive index close to silica glass to make adhesion and fixation of the thin-film element in the groove. The depth of the groove is set to 100 µm or more and 300 µm or less, and the etching cross section of the optical waveguide portion made of SiO2 holds verticality relative to the substrate face and its surface is smooth.

It should be noted that, in FIG. 4 as well, an actual pattern configuration image differs in terms of the width and length, for example, of the groove relative to the optical waveguide. If actual dimension relations are depicted, the groove, wave retarder, and the like will be invisible, and thus, the width of the groove and the thickness of the wave retarder are relatively enlarged and exaggerated.

As in the optical circuit of the present embodiment, in the case of configuring the PBS arrays 41a to 41d, the grooves 43, 44 are arranged so as to intersect only the respective required optical waveguides even in a case where other optical waveguides 42a to 42e that are not connected to any PBS are closely arranged between a PBS and another PBS. Therefore, an optical waveguide that is required to have a groove and a corresponding groove is in a one-to-one correspondence. A groove is not naturally formed on the optical waveguides 42a to 42e which require no groove.

As to the optical waveguide 45 and optical waveguide 46, which are the arm waveguide, all of the grooves are equivalently influenced, and thus, there is no limitation for the interval between the waveguides. In order to make each of the grooves to be equivalently influenced, it is preferable that the pair of optical waveguides, which is the arm waveguide, have the same distance from each groove to each of the adjacent optical waveguides 42a to 42e.

As described above, since an interval between the two optical waveguides for the pair of arm waveguides 45, 46 can be closely arranged, more compact and efficient optical circuit arrangement is allowed by further applying the configuration of the connected grooves as shown in FIG. 7A to FIG. 7C to the present invention in which the plurality of grooves are arranged such that they are deviated along the direction of the optical waveguides and their portions in a direction substantially vertical to the optical waveguide are facing each other.

In order to implement the configuration in which the PBS arrays and the plurality of optical waveguides 42a to 42e of through-connections are alternately arranged as shown in FIG. 4 using the conventional technique, forming one common groove piercing a position where individual PBS grooves are formed as shown in FIG. 2 has been the only way. In such a case, in order to insert different λ/4 wave retarders for the arm waveguides 45, 46, an interval between the arm waveguides 45, 46 has been required to be sufficiently large. Furthermore, a groove must intersect other optical waveguides 42a to 42e that have not originally been required to form a groove. In such optical waveguides, an adhesive or refractive index matching material must be filled for reducing loss or unnecessary excess loss must be accepted, which has resulted in a great disadvantage in the aspect of the performances of the optical circuit.

In contrast, in the optical waveguide device of FIG. 4, due to the groove of a characteristic configuration in the present invention which includes the minimum length of the grooves provided individually for the optical waveguides that require grooves, the interval between the arm waveguides can also be set to be smaller. Furthermore, there is no need to consider the occurrence of excess loss for other optical waveguides 42a to 42e that are not connected to the PBS arrays 41a to 41d. No wasteful arrangement area 154 shown in FIG. 2 appears on the layout on the circuit substrate. The fundamental elements can be arranged efficiently on the circuit substrate to implement the optical interference circuit. The optical interference circuit can be configured more compactly compared to the case of using the common groove of a conventional technique.

In the optical waveguide device of the present invention, the groove is formed for every optical waveguide for inserting the wave retarder and a direction of the groove is further tilted to a degree larger than 90 degrees relative to the optical waveguide. Moreover, by arranging the adjacent grooves such that their portions in a direction vertical to the optical waveguide are facing each other, the size of the circuit in a light propagation direction can be suppressed, and the entire optical circuit can be downsized. The optical waveguide device of the present invention is remarkably effective in the case of the configuration in which the plurality of circuits for inserting the plurality of thin-film elements are arrayed in large numbers as shown in FIG. 4. In addition, as for the pair of optical waveguides, there is no need to insert the thin-film element and they can also be applied to a groove (e.g., the groove 36 in FIG. 3) which is formed for making the amount of loss to be uniform.

In the present embodiment, the function as the PBS which polarization-splits the output lights 48a, 48b by inputting the signal light 47 from the input waveguide at the left side of FIG. 4 has been explained, but it is possible to be operated as a polarization beam combiner by inputting each of linear polarized waves in a horizontal direction and a vertical direction relative to the substrate from the optical waveguide from which the output lights 48a, 48b at the right side of FIG. 4 are outputted. In this case, an orthogonal polarization-multiplexed light is outputted from the input waveguide to which the signal light 47 is inputted in the present embodiment.

The groove in the present invention may preferably include an extended portion of a trapezoidal shape or a triangular shape as explained in FIG. 5A in addition to the rectangular portion 52 (FIG. 5A) into which a thin-film element is inserted. In order to introduce a resin (or an adhesive) for fixing the thin-film element into the groove, a somewhat larger extended portion 51 of a trapezoidal shape (FIG. 5A) is provided at one end of the rectangular portion, and further, the extended portion 53 of a triangular shape (FIG. 5A) can be arranged at the other end of the rectangular portion as a resin reservoir for making the introduced resin (adhesive) sufficiently reach the entire groove. These extended portions can be formed using the deep etching technique together with the formation of the groove, and the configuration of the present embodiment of FIG. 4 can be applied within the range of sufficiently reducing the size of the optical circuit. It is needless to say that the shape of the extended portion may be changed to various shapes. For instance, the extended portion of a trapezoidal shape has been explained to be continuously formed in the longitudinal direction of the rectangular portion of the groove, but an extended portion of a trapezoidal shape may be configured so as to be arranged in the same direction as that of the optical waveguide via the middle portion which is gradually bent by 90 degrees from the end portion of the rectangular portion. Any kind of configuration is allowed to introduce a material for adhesion and fixation of the thin-film element in the groove, and a material-accommodating function for accommodating an extra material may be implemented by setting the capacity of the groove including the rectangular portion to an appropriate amount beforehand.

Furthermore, in the case where the groove has an extended portion formed in a quadrangular or polygonal shape, a crack or the like may possibly occur as a result of concentrated stress of the substrate on the vertex portion of the groove. As shown in FIG. 6, it is possible to make the vertex portion to be in an arc shape with a rounded corner having a radius of about 10 to 50 µm.

In the above-described first embodiment and second embodiment, the waveguide type device of the silica-based glass configured on the silicon substrate has been explained as an example, but the present invention is applicable to all the optical waveguide devices using other materials constituting the optical waveguide such as a high polymer, semiconductor, silicon, and lithium niobate of an ion-diffused type. As for each of the materials for the optical waveguide other than SiO2, it is also possible to use the deep etching technique which has higher selectivity ratio for the depth direction which is vertical to the horizontal direction of the substrate. By using the deep etching technique, grooves corresponding to the optical waveguides requiring the grooves are configured by one to one, and thus, the restraint on the flexibility of circuit designs relating to the groove structure and optical performances can be resolved and the further downsizing of the optical circuit can be realized. Further, by adopting the groove configuration having an extended portion specific to the present invention, a problem of complicated adjustment in manufacturing and assembling processes may not occur even if the number of grooves is increased. The optical waveguide device of the present invention is remarkably effective for the optical transceiver used in the digital coherent optical transmission including the optical interference circuit.

As described above in detail, according to the optical waveguide device of the present invention, the downsizing of the optical interference circuit having a groove for inserting the thin-film element such as the optical retardation plate is realized. Further, the optical interference circuit that requires no complicated adjustment processes at the time of manufacturing and assembling can be provided.

INDUSTRIAL APPLICABILITY

The present invention can be used for a communication system in general. In particular, the present invention can be used for an optical waveguide type device of an optical communication system.

The invention claimed is:

1. An optical waveguide device which has a plurality of optical waveguides configured on a single substrate and into which one or more thin-film elements are inserted substantially perpendicularly to a substrate face by intersecting the optical waveguides, the optical waveguide device comprising:
   grooves that intersect at least two or more respective optical waveguides among the plurality of optical waveguides, wherein
   each of the grooves includes a rectangular portion into which a corresponding thin-film element is inserted, and intersects only one corresponding optical waveguide and does not intersect other optical waveguides adjacent to the one corresponding optical waveguide,
   at least two adjacent grooves among the grooves are arranged such that their end portions face each other along a direction substantially parallel to the one corresponding optical waveguide, and
   the thin-film elements disposed in the at least two adjacent grooves are not in direct optical communication with each other.

2. The optical waveguide device according to claim 1, wherein
   the at least two adjacent grooves are arranged such that facing sides of the at least two adjacent grooves are combined via a connected portion of 1 mm or less formed between respective facing end portions of the at least two adjacent grooves.

3. The optical waveguide device according to claim 2, wherein at least some of the grooves further comprises at least one extended portion which is continuously formed from an end portion of the rectangular portion.

4. The optical waveguide device according to claim 3, wherein
the extended portion at least partially has a wider shape as getting apart from an end portion of the rectangular portion.

5. The optical waveguide device according to claim 1, wherein
at least some of the grooves further comprises at least one extended portion which is continuously formed from an end portion of the rectangular portion.

6. The optical waveguide device according to claim 5, wherein
the extended portion at least partially has a wider shape as getting apart from an end portion of the rectangular portion.

7. The optical waveguide device according to claim 5, wherein the extended portion comprises:
a first extended portion continuously formed from one end of the rectangular portion toward a longitudinal direction of the rectangular portion; or
a second extended portion continuously formed from another end of the rectangular portion toward a direction in which the one corresponding optical waveguide is configured.

8. The optical waveguide device according to claim 7, wherein
the first extended portion at least partially has a wider shape as getting apart from the one end.

9. The optical waveguide device according to claim 8, wherein
the first extended portion includes a substantial trapezoidal shape having a wider bottom at a side apart from the one end, and
the second extended portion includes a triangular shape having a portion in a vicinity of the other end on a long side of the rectangular portion as one side.

10. The optical waveguide device according to claim 7, wherein
the first extended portion includes a substantial trapezoidal shape having a wider bottom at a side apart from the one end, and
the second extended portion includes a triangular shape having a portion in a vicinity of the other end on a long side of the rectangular portion as one side.

11. The optical waveguide device according to claim 5, wherein
the extended portion accommodates an extra adhesive that does not contribute to fixing the thin-film element.

12. The optical waveguide device according to claim 11, wherein
the extended portion at least partially has a wider shape as getting apart from an end portion of the rectangular portion.

13. The optical waveguide device according to claim 11, wherein the extended portion comprises:
a first extended portion continuously formed from one end of the rectangular portion toward a longitudinal direction of the rectangular portion; or
a second extended portion continuously formed from another end of the rectangular portion toward a direction in which the one corresponding optical waveguide is configured.

14. The optical waveguide device according to claim 13, wherein
the first extended portion at least partially has a wider shape as getting apart from the one end.

15. The optical waveguide device according to claim 14, wherein
the first extended portion includes a substantial trapezoidal shape having a wider bottom at a side apart from the one end, and
the second extended portion includes a triangular shape having a portion in a vicinity of the other end on a long side of the rectangular portion as one side.

16. The optical waveguide device according to claim 15, wherein
the plurality of grooves are formed, with respect to a material constituting the plurality of optical waveguides, by a deep etching process having a larger selectivity ratio in a depth direction which is perpendicular to the substrate face.

17. The optical waveguide device according to claim 13, wherein
the first extended portion includes a substantial trapezoidal shape having a wider bottom at a side apart from the one end, and
the second extended portion includes a triangular shape having a portion in a vicinity of the other end on a long side of the rectangular portion as one side.

* * * * *